United States Patent
Kikkawa et al.

(10) Patent No.: US 8,208,070 B2
(45) Date of Patent: Jun. 26, 2012

(54) VIDEO DISPLAY APPARATUS AND CONTROL METHOD THEREOF, AND VIDEO OUTPUT APPARATUS AND CONTROL METHOD THEREOF

(75) Inventors: Teruki Kikkawa, Yokohama (JP); Yoshikazu Shibamiya, Tokyo (JP); Yasushi Shikata, Tama (JP); Hirofumi Urabe, Kawasaki (JP); Daisuke Takayanagi, Kawasaki (JP); Chika Masuda, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 12/361,125

(22) Filed: Jan. 28, 2009

(65) Prior Publication Data
US 2009/0195706 A1 Aug. 6, 2009

(30) Foreign Application Priority Data
Feb. 5, 2008 (JP) ................. 2008-025737

(51) Int. Cl.
*H04N 5/46* (2006.01)
*H04N 3/27* (2006.01)
(52) U.S. Cl. ............. 348/555; 348/554; 348/207.1; 709/232; 709/230
(58) Field of Classification Search .......... 348/552–570, 348/725, 571, 207.1; 709/230–237
See application file for complete search history.

(56) References Cited

U.S. PATENT DOCUMENTS

| | | | |
|---|---|---|---|
| 2003/0084176 A1* | 5/2003 | Tewari et al. | 709/230 |
| 2007/0204064 A1 | 8/2007 | Mail et al. | |
| 2009/0041155 A1 | 2/2009 | Sugai et al. | |

FOREIGN PATENT DOCUMENTS

| | | |
|---|---|---|
| CN | 1852436 A | 10/2006 |
| EP | 1507212 A1 | 2/2005 |
| GB | 2364215 A | 1/2002 |
| JP | 2003-289523 | 10/2003 |
| JP | 2003-304459 | 10/2003 |
| JP | 2004-102339 | 4/2004 |
| JP | 2006-236138 | 9/2006 |
| WO | 03/032585 A1 | 4/2003 |
| WO | 03/056776 A1 | 7/2003 |
| WO | 2006/126260 A1 | 11/2006 |

OTHER PUBLICATIONS

The above reference was cited in a May 12, 2010 Chinese Office Action, which is enclosed with English Translation, that issued in Chinese Patent Application No. 200910006914.8.
The above references were cited in a Oct. 14, 2011 European Search Report, which is not enclosed, that issued in European Patent Application No. 09150535.4.

* cited by examiner

*Primary Examiner* — Michael Lee
(74) *Attorney, Agent, or Firm* — Cowan, Liebowitz & Latman, P.C.

(57) ABSTRACT

When a video output apparatus (100) is connected, a video display apparatus (200) obtains information of content data stored in the video output apparatus (100). Then, based on the obtained information, the video display apparatus (200) determines whether the content data is decodable with respect to itself. If it is not decodable, it requests the video output apparatus (100) to decode the content data before transferring the content data using a data transfer method specified. By doing this, an appropriate transfer protocol is selected automatically when transferring content data between the video display apparatus (200) and the video output apparatus (100).

8 Claims, 6 Drawing Sheets

VIDEO DISPLAY APPARATUS AND CONTROL METHOD THEREOF, AND VIDEO OUTPUT APPARATUS AND CONTROL METHOD THEREOF

BACKGROUND OF THE INVENTION

1. Field of the Invention

The present invention relates to video display apparatuses and control methods thereof as well as video output apparatuses and control methods thereof, and particularly relates to techniques of setting data transfer methods between video output apparatuses and video display apparatuses.

2. Description of the Related Art

There is an increasing number of users who connect a video output apparatus such as a digital camera or a video camera to a video display apparatus such as a television to view camera-captured content. In order to achieve such functionality, an interface that connects the apparatuses supports a plurality of transfer protocols such as file transfer and stream transfer, and carries out communications while switching the protocol that is used when necessary.

That the apparatus interface supports a plurality of transfer protocols is advantageous in that the user has many choices, but on the other hand it unit that the user must select one of the choices. Furthermore, there is an issue in that selection may be difficult for users who are unfamiliar with transfer protocols.

For a configuration in which a memory device and a content display apparatus are connected, Japanese Patent Laid-Open No. 2006-236138 discloses a method for switching transfer protocols in response to a process selected by the user in an application. Specifically, a stream transfer protocol is selected when the user requests content playback, and a file transfer protocol is selected when there is a drag and drop operation.

Furthermore, Japanese Patent Laid-Open No. 2003-304459 discloses a technique in which, in a case where a video/audio playback apparatus is capable of outputting both analog signals and digital signals, a recommended output is determined from a state of validity of analog output/digital output of the video/audio playback apparatus and a state of OSD (on-screen display) output.

In the technique disclosed in Japanese Patent Laid-Open No. 2006-236138, the protocol to be selected in response to user operation is fixed. For example, the stream transfer protocol is always selected when content playback is to be performed.

For this reason, problems may occur depending on the type of data that is undergoing operation. For example, in a case where a user, who is trying to view video content using a viewer application built in a television, has performed a drag and drop operation on image data of a format not supported by the viewer application, the user will not be able to view the image data.

The technique disclosed in Japanese Patent Laid-Open No. 2003-304459 is also unable to solve this problem.

SUMMARY OF THE INVENTION

The present invention has been devised in consideration of these issues of conventional techniques, and provides a video display apparatus and control method thereof, and a video output apparatus and control method thereof that are capable of automatically selecting an appropriate transfer protocol when content data is transferred.

According to an aspect of the present invention, there is provided a video display apparatus that obtains content data from a video output apparatus using one of a plurality of transfer protocols and displays the obtained content data, comprising: a first obtaining unit that obtains, from the video output apparatus, information of content data, information regarding at least a coding scheme; a first determination unit that determines whether the content data is decodable by the video display apparatus based on information regarding a coding scheme obtained by the first obtaining unit; a determining unit that determines, when it has been determined by the first determination unit that the content data is not decodable by the video display apparatus, among the plurality of transfer protocols, a transfer protocol in which the content data is decoded at the video output apparatus and transferred by a stream transfer; and a request unit that specifies the transfer protocol determined by the determining unit and requests the video output apparatus for transfer of the content data.

According to another aspect of the present invention, there is provided a video output apparatus that outputs content data stored in a storage device to a video display apparatus using one of a plurality of transfer protocols, comprising: a first obtaining unit that obtains, from the video display apparatus, information regarding at least a coding scheme for content data stored by the video display apparatus; a first determination unit that determines a coding scheme decodable by the video display apparatus based on information regarding a coding scheme obtained by the first obtaining unit; a determining unit that determines, when it has been determined by the first determination unit that the coding scheme of the content data stored in the storage device is not a coding scheme decodable by the video display apparatus, among the plurality of transfer protocols, a transfer protocol in which the content data is decoded at the video output apparatus and transferred by a stream transfer; and a notification unit that notifies the video display apparatus of the transfer protocol determined by the determining unit.

According to a further aspect of the present invention, there is provided a control method of a video display apparatus that obtains content data from a video output apparatus using one of a plurality of transfer protocols and displays the obtained content data, comprising: a first obtaining step of obtaining, from the video output apparatus, information of content data, including information regarding at least a coding scheme; a first determination step of determining whether the content data is decodable by the video display apparatus based on information regarding a coding scheme obtained in the first obtaining step; a determining step of determining, when it has been determined in the first determination step that the content data is not decodable by the video display apparatus, among the plurality of transfer protocols, a transfer protocol in which the content data is decoded at the video output apparatus and transferred by a stream transfer; and a request step of specifying the transfer protocol determined in the determining step and requesting the video output apparatus for transfer of the content data.

According to yet further aspect of the present invention, there is provided a control method of a video output apparatus that outputs content data stored in a storage device to a video display apparatus using one of a plurality of transfer protocols, comprising: a first obtaining step of obtaining, from the video display apparatus, information regarding at least a coding scheme for content data stored by the video display apparatus; a first determination step of determining a coding scheme decodable by the video display apparatus based on information regarding a coding scheme obtained in the first obtaining step; a determining step of determining, when it has been determined by in first determination step that the coding scheme of the content data stored in the storage device is not a coding scheme decodable by the video display apparatus, among the plurality of transfer protocols, a transfer protocol in which the content data is decoded at the video output apparatus and transferred by a stream transfer; and a notification step of notifying the video display apparatus of the transfer protocol determined in the determining step.

Further features of the present invention will become apparent from the following description of exemplary embodiments with reference to the attached drawings.

DESCRIPTION OF THE EMBODIMENTS

First Embodiment

Preferred embodiments of the present invention will now be described in detail in accordance with the accompanying drawings.

It should be noted that without limitative description to the contrary, specific structural members and functions, shapes, and relative arrangements thereof described in the embodiments are exemplifications and are not intended to limit the scope of the present invention.

Figure 1:
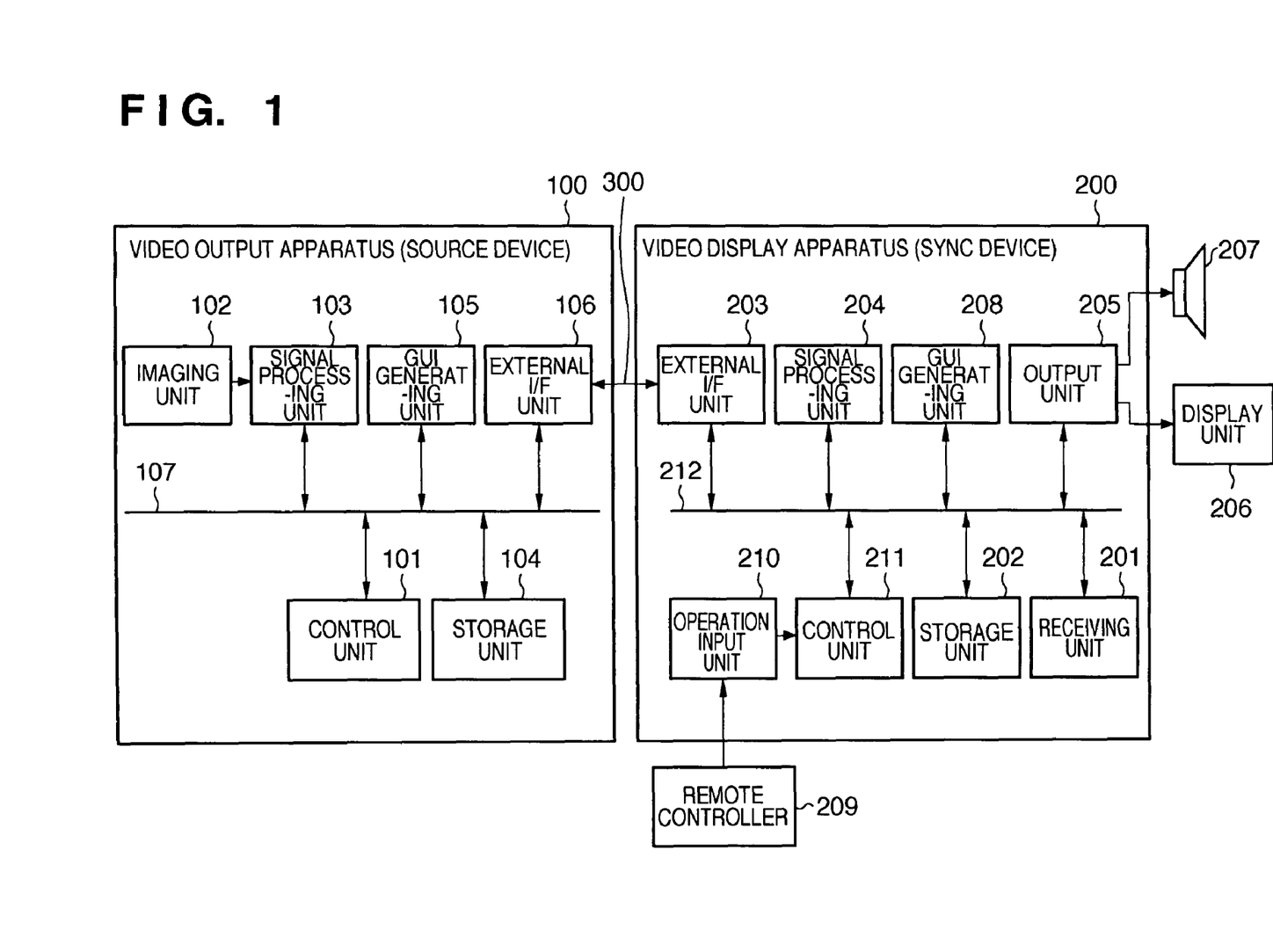
FIG. 1 is a block diagram showing a configuration example of a content data transfer system according to a first embodiment of the present invention that has been configured such that a video display apparatus and a video output apparatus are connected communicably.

FIG. 1 is a block diagram showing a configuration example of a content data transfer system according to a first embodiment of the present invention that has been configured such that a video display apparatus and a video output apparatus are connected communicably.

In FIG. 1, a video output apparatus 100 (hereinafter referred to as source device) and a video display apparatus 200 (hereinafter referred to as sync device are communicably connected via a connection line 300.

In the present embodiment, the source device 100 is assumed to be a camera for example. A control unit 101 of the source device 100 performs overall control of the following portions.

An imaging unit 102 is provided with a lens for forming an image of a subject image, an image sensor for converting the subject image, which has been formed into an image by the lens, into electrical signals of pixel units, and an A/D converter that performs A/D conversion on the electrical signals output by the image sensor and outputs pixel data. The pixel data is input to a signal processing unit 103.

The signal processing unit 103 is constituted by a level correction unit, a white balance correction unit, a gamma correction unit, a color processing unit, a color difference conversion unit, and a codec unit. The signal processing unit 103 applies signal processing according to settings on the pixel data input from the imaging unit 102 and stores this in a format of raw data or JPEG data via a bus 107 to a storage unit 104.

The data format at the time of storage can be set by the user for example and may be set such that the contents of equivalent scenes that have been captured are stored in a single data format or may be set such that the contents of equivalent scenes that have been captured are stored in a plurality of different data formats.

The storage unit 104 is provided with a memory device, and information such as storage location (directory) information, coding scheme, frame frequency, data format information, and image size information of the content data that is stored is managed as a content profile.

A GUI generating unit 105 renders content information such as date/time of capture and file name, and text and graphical information such as an operation guide of the source device 100 or the sync device 200 on a GUI plane of the video memory. Then this is superimposed on the video signals of the content decoded by the signal processing unit 103 and output to an external I/F unit 106.

Based on a transfer control method to be described later, the external I/F unit 106 executes stream transfer and/or file transfer between itself and the sync device 200.

In the present embodiment, at the time of a stream transfer, the external I/F unit 106 outputs to the sync device 200 video signals of the content specified by the user via the GUI generating unit 105. And at the time of a file transfer, it outputs to the sync device 200 in file units the content data obtained from the storage unit 104. In a case where content data has undergone file transfer to the sync device 200, it is necessary to carry out a decoding process of the content data in the sync device 200.

In the present embodiment, the sync device 200 is a digital television and is provided with a receiving unit 201, which receives broadcast signals and outputs video signals and audio signals, and a storage unit 202, which stores as content data the video signals and audio signals obtained from the receiving unit 201.

At the time of a stream transfer, an external I/F unit 203 outputs the video signals and audio signals of external input that has been input from the source device 100 to an output unit 205 via a bus 212. At the time of a file transfer, the data received from the source device 100 is stored in predetermined file units as content data in the storage unit 202.

A signal processing unit 204 obtains video signals and audio signals of the content from the storage unit 202 and outputs to a display unit 206 and an audio output unit 207 via the output unit 205.

A GUI generating unit 208 renders content information such as date/time of capture and file name, and text and graphical information such as an operation guide of the sync device 200 on a GUI plane of a video memory of the sync device 200. Then this is superimposed on the video signals of the content decoded by the signal processing unit 204 and output to the output unit 205. Furthermore, the GUI generating unit 208 also performs rendering and outputting for other GUIs such as display of menus of the sync device 200 and program information received through broadcast signals.

When the user operates a remote controller 209, operational content is received by an operation input unit 210 and output to a control unit 211. At the time of a stream transfer, the control unit 211 sends key operations of the remote controller 209 to the source device 100 via the connection line 300 as pass-through commands for controlling the source device. On the other hand, at the time of a file transfer, it either processes the key operations of the remote controller 209 as key operations indicating actions of the sync device 200 or converts the key operations of the remote controller 209 as control commands by which requests such as directory operations and searches or the like of the source device 100 are carried out, and sends these via the connection line 300. The source device 100 executes appropriate processes in response to received commands and returns process results to the sync device 200 when necessary.

In the present embodiment, it is assumed that the external I/F units 106 and 203 support transfer protocols of at least file transfer and stream transfer, but they may also support other protocols. Furthermore, the connection line 300 is not limited to being wired and may be wireless.

Next, description is given regarding actions when a digital camera 100 as the source device and a digital television 200 as the sync device are connected according to the present embodiment.

Figure 2:
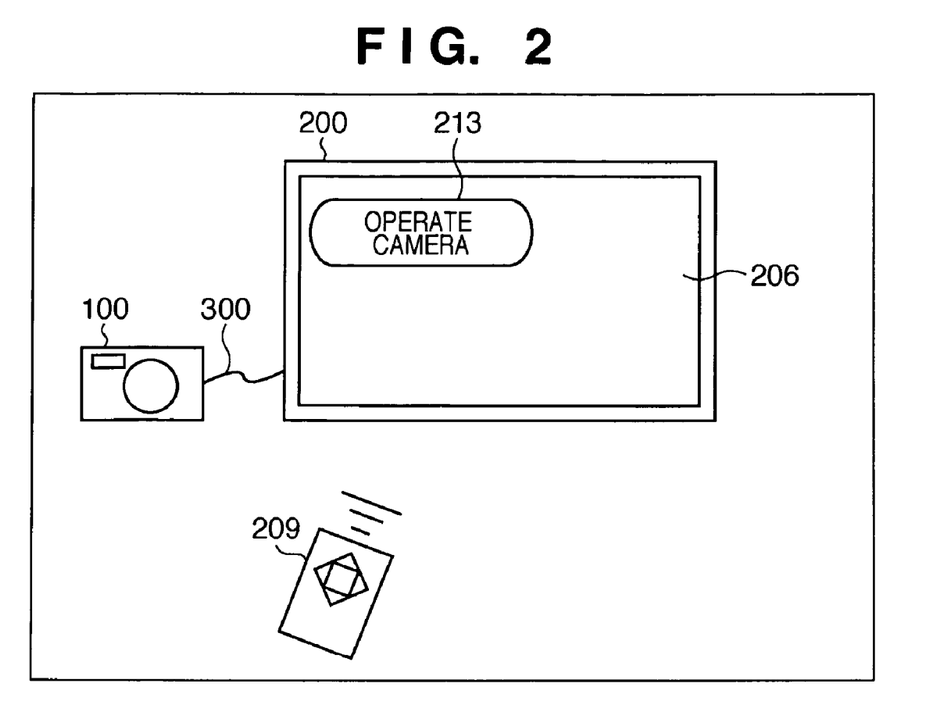
FIG. 2 is a diagram showing an example of a manner of display on the video display apparatus according to the first embodiment of the present invention when the video display apparatus and the video output apparatus are connected.

When the user connects the source device 100 to the sync device 200 by connecting the external I/F units 106 and 203 using the connection line 300, the GUI generating unit 208 of the sync device 200 displays an icon for commencing operations of the source device 100 on the display unit 206 (FIG. 2). In the example of FIG. 2, an icon 213 is an icon for commencing operation of the source device 100.

When the user uses the remote controller 209 to carry out an operation of pressing the icon 213, such an operation being regarded as a request for commencement of operation of the source device 100, the control unit 211 of the sync device 200 sends a command to the source device 100 through the external I/F unit 203 requesting power to be turned on. Furthermore, the control unit 211 reads out and launches a viewer application stored in the storage unit 202 for example. Further still, as is described later, the control unit 211 specifies a transfer protocol to the source device 100.

In the present embodiment, the viewer application that is executable by the sync device 200 includes:

(1) an external input viewer application for displaying and outputting external input signals that have been decoded by the source device 100 and input as a stream transfer, and (2) an internal viewer application for displaying and outputting content data, which has undergone file transfer and is stored in the storage unit 202, with the decoding performed by the signal processing unit 204.

Figure 3:
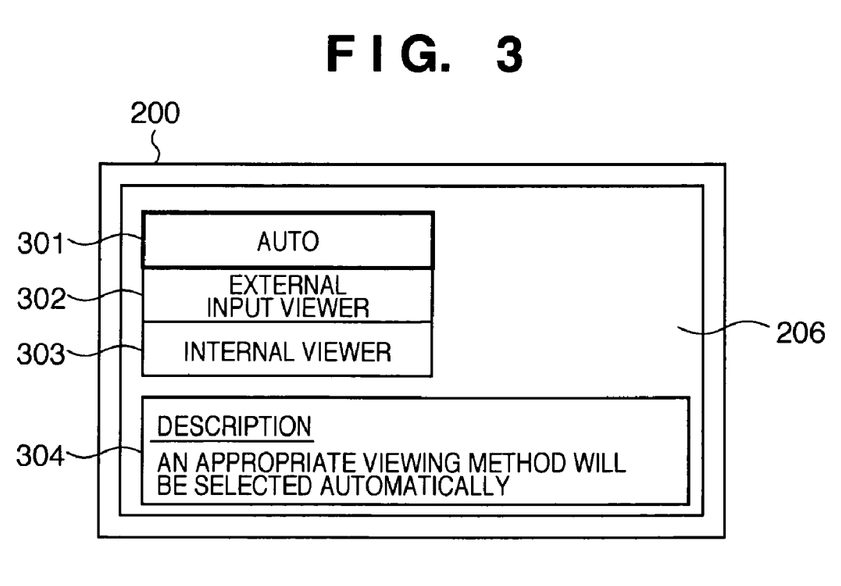
FIG. 3 is a diagram showing an example of a launch setting screen of a viewer application displayed on the video display apparatus according to the first embodiment of the present invention.

Here, the user can set which of the viewer applications to launch in response to the operation commencement request. For example, when the camera 100, as the source device, is first connected to the sync device 200, the GUI generating unit 208 may display a settings screen on the display unit 206 to allow the user to perform the settings. FIG. 3 is a diagram showing an example of a launch setting screen of the viewer application.

Selectable items on the launch setting screen include auto 301, an external input viewer 302, and an internal viewer 303. The user can specify one of these items and give instruction to the sync device 200 by performing a focus movement and a decision operation using up/down keys on the remote controller. A description dialog box 304 describes an outline of the setting item being focused on, and therefore the user can reference the description dialog box 304 and grasp details of each item in more detail. Launch settings corresponding to items specified from the launch setting screen may be stored in the storage unit 202 for example.

In a case where the user specifies the item "external input viewer", when the user next connects the sync device 200 and the source device 100, the sync device 200 launches the external input viewer application and requests the source device 100 for a stream transfer.

On the other hand, in a case where "internal viewer" is specified, when the user next connects the sync device 200 and the source device 100, the sync device 200 launches the internal application and requests the source device 100 for a file transfer.

When "auto" is specified here, an appropriate protocol is determined automatically for the stream transfer protocol and the file transfer protocol as the transfer protocol requested to the source device 100 in accordance with a procedure to be described below.

Figure 4:
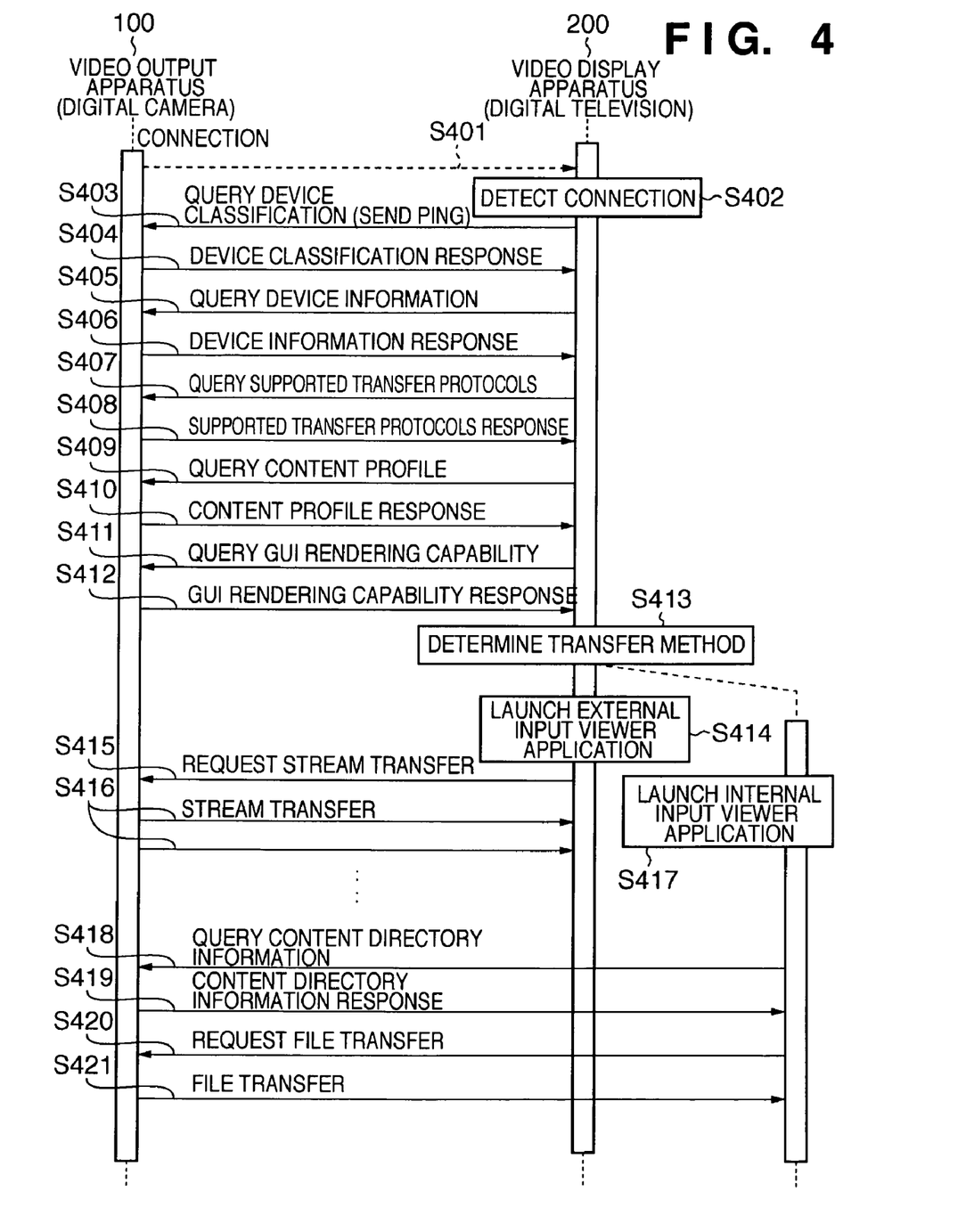
FIG. 4 is a sequence diagram for describing a communication procedure in specifying a transfer protocol from a sync device 200 to a source device 100 according to the first embodiment of the present invention.

FIG. 4 is a sequence diagram for describing a communication procedure in specifying a transfer protocol from the sync device 200 to the source device 100.

When the control unit 211 of the sync device 200 detects via the external I/F unit 203 that the source device 100 has connected (S401, S402), it sends a command to the source device 100 to confirm the device classification (S403). Upon receiving this command, the control unit 101 of the source device 100 returns the device classification as a response (S404). At this time, the control unit 211 can confirm that the device connected to the external I/F unit 203 is a camera.

The control unit 211 sends a further command to query the source device 100 about device information (S405) and in response to this, the control unit 101 returns device information such as manufacturer, serial number, and firmware version as a response (S406).

Next, the control unit 211 queries the source device 100 about corresponding transfer protocols (S407) and the control unit 101 returns corresponding transfer protocols as a response (S408). With this response, the control unit 211 can confirm that the source device 100 supports stream transfer and file transfer.

Next, the control unit 211 queries the source device 100 about the profiles of content data stored (S409) and the control unit 101 returns as a response the profiles that have been read out from the storage unit 104 of the content data (S410). As described earlier, content profiles include information such as the coding scheme of the content data, the file format as the storage system, the number of pixels, and the frame frequency.

Further still, the control unit 211 queries the source device 100 about information relating to the GUI rendering capability (S411). The control unit 101 of the source device 100 returns as a response information relating to the GUI generating unit 105, for example, the width/height of the GUI plane, the color bit depth, and particularly information relating to picture quality, such as the number of gradations of original image data of icons to be rendered, for example (S412).

When the processing up to here finishes, the control unit 211 of the sync device 200 determines the transfer protocol based on information obtained from the source device 100 (S413). Then, the viewer application for viewing content is launched and instruction is given to the source device 100 of the transfer protocol that has been specified. A description is given later concerning the process for determining the method of transfer.

When it is determined that the stream transfer protocol will be used as the transfer protocol, the control unit 211 of the sync device 200 launches the external input viewer application (S414) and displays and playbacks the content data that has undergone stream transfer from the source device 100 (S415 and S416).

On the other hand, when it is determined that the file transfer protocol is to be used, the control unit 211 launches the internal viewer application (S417) and sends a command to query directory information of the content data stored in the storage unit 104 of the source device 100 (S418). Upon receiving this command, the control unit 101 returns directory information of the content data to the sync device 200 as a response (S419).

Based on the received directory information, the control unit 211 requests the source device 100 for a file transfer (S420). Having been requested for a file transfer, the control unit 101 of the source device 100 successively transfers content data to the sync device 200 (S421).

Figure 5:
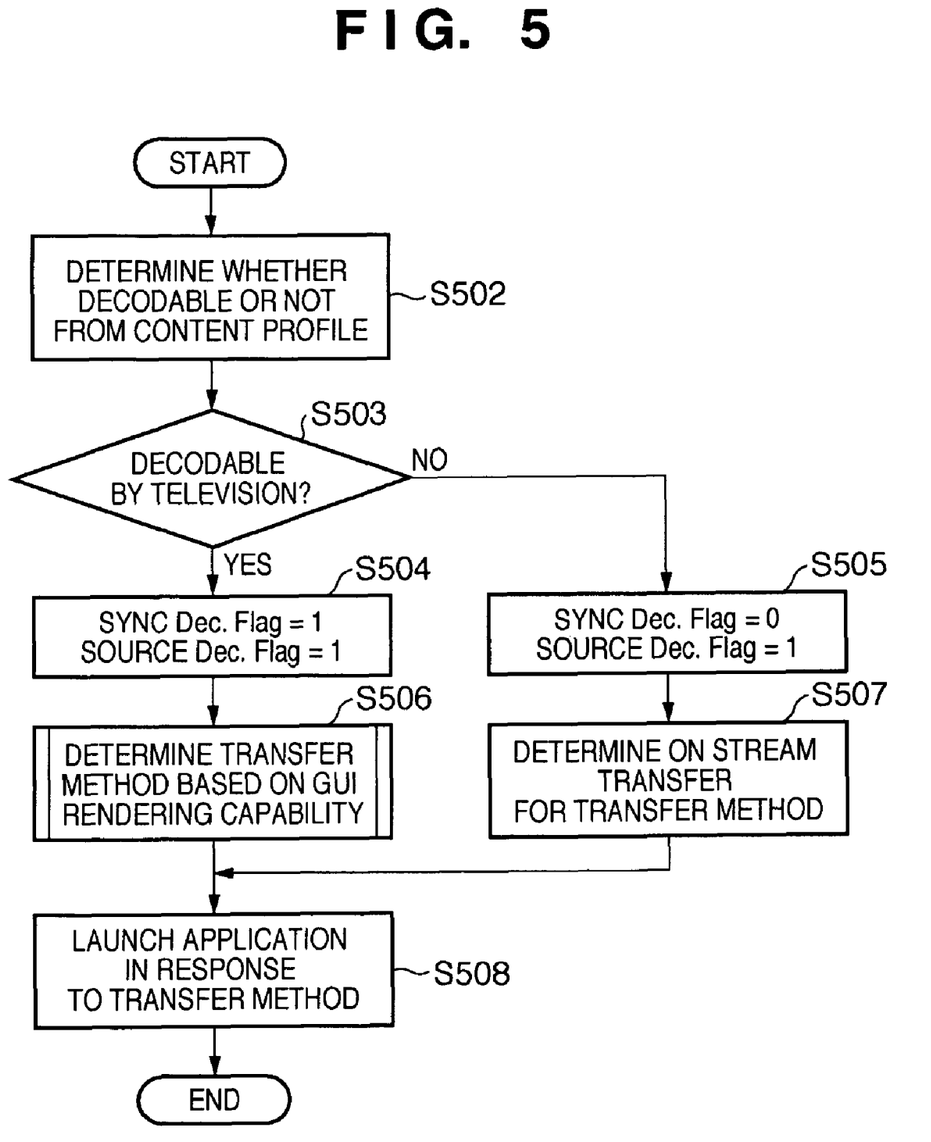
FIG. 5 is a flowchart for describing details of a process for determining a method of transfer in S413 in FIG. 4.

FIG. 5 is a flowchart for describing details of the process for determining the method of transfer in S413 in FIG. 4.

From information relating to the coding scheme, which is contained in the content profile obtained in S410, the control unit 211 determines whether the content data is in a format decodable by the signal processing unit 204 (S502).

When determined that it is decodable by the signal processing unit 204 (yes in S503), the control unit 211 sets a sync decoder flag (hereinafter, sync dec. flag)=1 and a source decoder flag (hereinafter, source dec. flag)=1 (S504).

Then, a process of determining the transfer method is executed based on the GUI rendering capability (S506). Detailed description is given later, but in this process of determining the transfer method, a sync GUI flag and a source GUI flag are set. The control unit 211 determines the transfer method (transfer protocol) in response to values of the sync dec. flag, the source dec. flag, the sync GUI flag, and the source GUI flag.

On the other hand, when determined that it is undecodable by the signal processing unit 204 (no in S503), the control unit 211 sets the sync dec. flag=0 and the source dec. flag=1 (S505).

Then, in S507, the control unit 211 determines the streaming transfer to be the transfer method.

In S508, the control unit 211 launches the viewer application corresponding to the transfer method (transfer protocol) that has been determined and requests the source device 100 for a data transfer.

Figure 6:
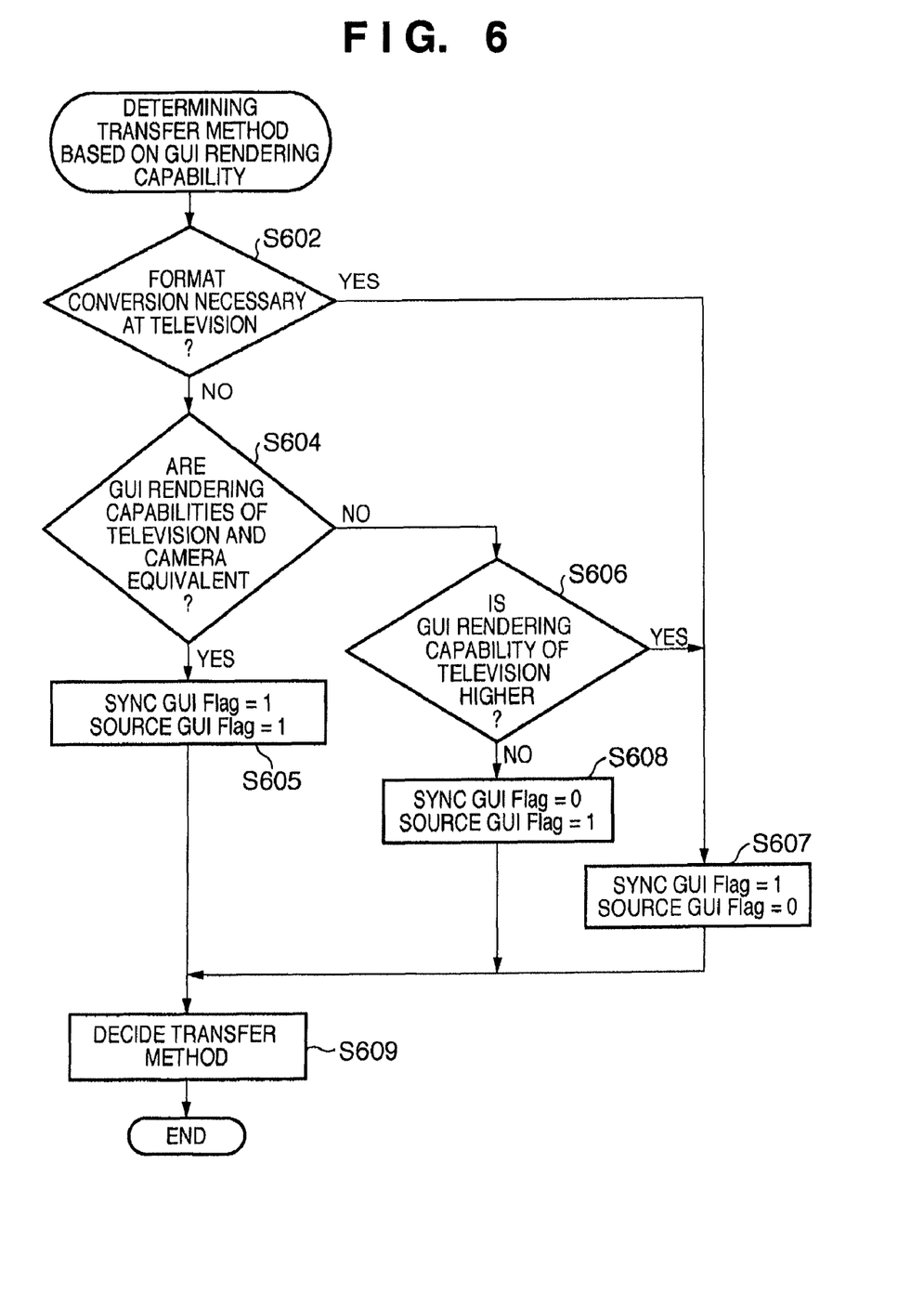
FIG. 6 is a flowchart for describing details of a process carried out in S506 in FIG. 5 of determining the transfer method based on a GUI rendering capability.

FIG. 6 is a flowchart for describing details of a process carried out at S506 in FIG. 5 of determining the transfer method based on the GUI rendering capability.

Based on the content profile obtained in 5410, the control unit 211 determines whether format conversion is necessary by the sync device 200 when displaying and outputting the content data (S602). Here, format conversion includes aspect ratio conversion and interlace-progressive conversion (IP conversion) and the like.

When it is determined that format conversion is necessary, the control unit 211 sets the sync GUI flag=1 and the source GUI flag=0 (S607).

When it is determined that format conversion is unnecessary, the control unit 211 determines that a video signal processing capability of the sync device 200 is equivalent to that of the source device 100. Then, the control unit 211 compares the GUI rendering capability of the source device obtained in S412 and the GUI rendering capability of the sync device (S604).

When a result of the comparison is that it is determined that the rendering capabilities are equivalent (yes in S604), the control unit 211 sets the sync GUI flag=1 and the source GUI flag=1 (S605). Here, the GUI rendering capabilities being equivalent is not limited to being completely the same, for example, it may be sufficient when differences in the width/height of the GUI plane, the number of gradations and the color bit depth when rendering data are within a predetermined range.

On the other hand, when it is judged that the rendering capabilities are not equivalent (no at S604), the control unit 211 determines whether the GUI rendering capability of the sync device 200 (capability of the GUI generating unit 208) is higher (S606).

When it is determined that the GUI rendering capability of the sync device 200 is higher (yes at S606), the control unit 211 sets the sync GUI flag=1 and the source GUI flag=0 (S607). On the other hand, when it is determined that the GUI rendering capability of the sync device 200 is lower (no at S606), the control unit 211 sets the sync GUI flag=0 and the source GUI flag=1 (S608). Here, the rendering capability being lower may be a case where the width or height of the GUI plane is small, a case where the number of gradations is low, or a case where the bit depth is shallow.

Then, the control unit 211 determines the transfer method (transfer protocol) in response to values of the sync dec. flag, the source dec. flag, the sync GUI flag, and the source GUI flag (S609).

Table 1 shows a relationship between values of the sync dec. flag, the source dec. flag, the sync GUI flag, and the source GUI flag and the transfer method to be determined according to the present embodiment.

TABLE 1

| Sync dec. | Source dec. | Sync GUI | Source GUI | Transfer method | Application to be launched |
|---|---|---|---|---|---|
| 0 | 1 | — | — | Stream | External input viewer |
| 1 | 0 | 0 | 1 | Stream | External input viewer |
|  |  | 1 | 0 | File | Internal viewer |
|  |  | 1 | 1 | Stream/(file) | External input viewer/ (Internal viewer) |

Here, it is shown that when all the flags are 1, that is, when all the following conditions are met:
  content data decodable by sync device 200
  format conversion by sync device 200 unnecessary
  GUI rendering capabilities equivalent in sync device 200 and source device 100
  then either stream transfer or file transfer may be determined. For example, in a case where stream transfer is set in advance as the default, then stream transfer is to be determined.

Otherwise, excluding a case where the content data is decodable by the sync device 200 and the GUI rendering capability of the sync device 200 is higher than the GUI rendering capability of the source device 100, stream transfer is determined.

For this reason, stream transfer is requested for content data that cannot be decoded by the sync device 200, and therefore the sync device can obtain video that has been decoded by the source device 100, making it possible for the user to view.

Furthermore, in a case where the content data is decodable by the sync device 200, if there is a difference in GUI rendering capabilities, then the transfer method is determined such that decoding is carried out by the side having the higher GUI rendering capability, thereby enabling the user to view and operate a GUI of high picture quality.

In this way, with the present embodiment, an appropriate transfer protocol can be selected automatically when transferring content data depending on whether the content data of the source device (video output apparatus) can be decoded by the sync device (video display apparatus).

Further still, in a case where the sync device is capable of decoding the content data, then the transfer protocol is determined such that decoding is performed by one of the source device and the sync device having the higher GUI rendering capability, thereby making it possible to provide the user with a GUI having high picture quality.

Second Embodiment

Next, description is given regarding a second embodiment of the present invention.

In the first embodiment, description was given regarding a configuration in which the sync device determines the transfer method (transfer protocol) and requests the source device for the transfer method that has been determined. In contrast to this, the present embodiment is different in being a configuration in which the source device determines the transfer method (transfer protocol).

In the second embodiment, based on the formats supported by the sync device 200 and the GUI rendering capability of the sync device 200, the source device 100 determines transfer method and gives notification to the sync device 200 of the transfer method that has been determined. The sync device 200 launches the appropriate viewer application based on the transfer method for which notification has been given by the source device 100 and gives instruction to the source device 100 of commencement of transfer.

Figure 7:
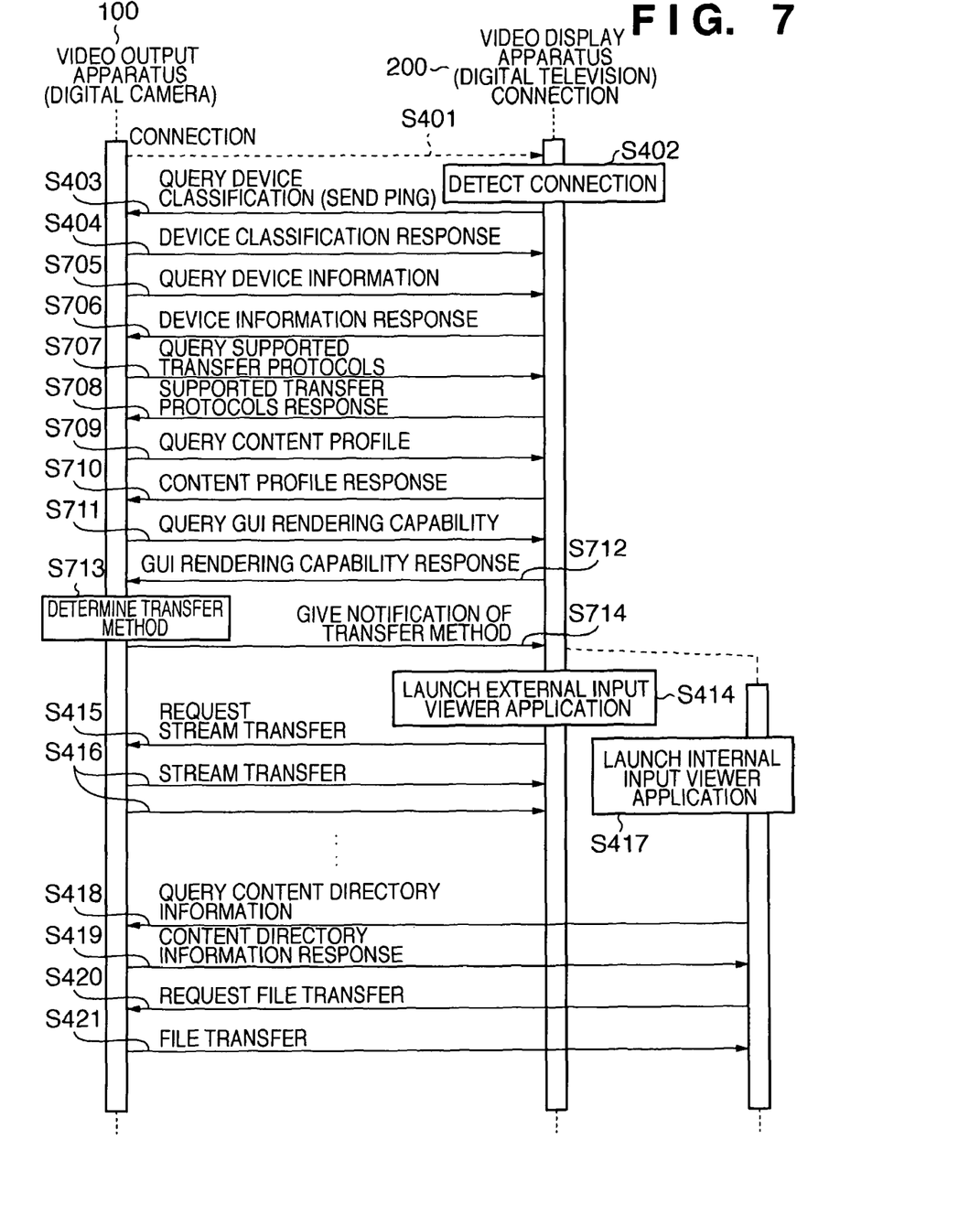
FIG. 7 is a sequence diagram for describing a communication procedure in specifying a transfer protocol from the sync device 200 to the source device 100 according to a second embodiment of the present invention.

FIG. 7 is a sequence diagram for describing a communication procedure for the sync device 200 to specify for the source device 100 the transfer protocol for which notification has been given from the source device 100. In FIG. 7, same reference numerals are assigned to equivalent procedures from FIG. 4 and duplicate description thereof is omitted.

Processes from where the sync device 200 detects connection of the source device 100 until carrying out the query of device classification (S401 to S403) are in common with the first embodiment.

Due to the query of device classification from the sync device 200 (S403), the control unit 101 of the source device 100 detects that the sync device 200 has been connected. Then, when it returns a response of its own device classification to the sync device 200 (S404), the control unit 101 of the source device 100 then sends a command querying device information to the sync device 200 (S705).

In response to this, the control unit 211 of the sync device 200 returns information such as manufacturer, serial number, and firmware version as a response (S706).

Thereafter, until the query of the GUI rendering capability (S711) and the response to that (S712), the same processing is carried out (S707 to S712) as in S407 to S412 in the first embodiment except that the direction of sending commands and responses to the commands is reversed.

In this series of processes, the control unit 101 of the source device 100 obtains the transfer protocols supportable by the sync device 200 (S708), the profiles of content data stored by sync device 200 (S710), and the GUI rendering capability of the sync device 200 (S712) respectively.

When processing up to here is finished, the control unit 101 of the source device 100 determines the transfer method (S713) based on information obtained in the processes of S706 to S712, then gives notification to the sync device 200 of the transfer method that has been determined (S714). It should be noted that the coding schemes decodable by the sync device 200 can be inferred from the content profiles that are obtained. That is, content data stored by the sync device 200 is considered to be in a format that is decodable by the sync device 200, and whether content data is in a format decodable by the sync device 200 is determined based on information relating to the coding schemes in the content profiles.

The method for determining the transfer method is the same as S413 in the first embodiment. Accordingly, in a case where content data stored by the storage unit 104 of the source device 100 cannot be decoded by the signal processing unit 204 of the sync device 200, a stream transfer is determined. Furthermore, in a case where content data can be decoded by the signal processing unit 204 of the sync device 200, the transfer method is determined so that playback can be performed using apparatus having the higher GUI rendering capability.

The processes after notification of transfer method at S714 are the same as in the first embodiment, and therefore further description is omitted.

As with the first embodiment, the present embodiment is also capable of automatically selecting an appropriate transfer protocol when content data is to be transferred. Further still, it also enables the GUI to be viewed with excellent picture quality.

Other Embodiments

In the foregoing embodiments, in a case where the content data is decodable by the sync device (video display apparatus), the transfer protocol is determined giving further consideration to the GUI rendering capabilities. However, it is not necessary in the present invention to give consideration to the GUI rendering capability. If the content data is in a format that cannot be decoded by the sync device, at least the problem of not being able to view the content data can be solved by automatically selecting a protocol by which the content data is decoded by the source device for transfer.

Furthermore, in the foregoing embodiments, description was given of a configuration in which consideration is given to whether format conversion by the sync device is necessary, then consideration is given to the GUI rendering capability only in a case where format conversion is unnecessary, but consideration may also be given directly to the GUI rendering capability without giving consideration to the necessity of format conversion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-025737, filed on Feb. 5, 2008, which is hereby incorporated by reference herein its entirety.

What is claimed is:

1. A video display apparatus that obtains content data from a video output apparatus using one of a plurality of transfer protocols and displays the obtained content data, comprising:

a first obtaining unit that obtains, from the video output apparatus, information of content data, including information regarding at least a coding scheme;

a first determination unit that determines whether the content data is decodable by the video display apparatus based on information regarding the coding scheme obtained by the first obtaining unit;

a second determination unit that determines, when it has been determined by the first determination unit that the content data is decodable by the video display apparatus, whether format conversion of the content data is required to the video display apparatus;

a determining unit that determines, when it has been determined by the first determination unit that the content data is not decodable by the video display apparatus, among the plurality of transfer protocols, a transfer protocol in which the content data is decoded at the video output apparatus and transferred by a stream transfer; and a request unit that specifies the transfer protocol determined by the determining unit and requests the video output apparatus for transfer of the content data, wherein when it has been determined by the second determination unit that the format conversion of the content data is required to the video display apparatus, the determining unit also determines, among the plurality of transfer protocols, a transfer protocol in which the content data is not decoded at the video output apparatus and transferred by a file transfer.

2. The video display apparatus according to claim 1, further comprising:

wherein when it has been determined by the second determination unit that format conversion of the content data is not required to the video display apparatus, the determining unit also determines, among the plurality of transfer protocols, a transfer protocol in which the content data is decoded at the video output apparatus and transferred by a stream transfer.

3. A video display apparatus that obtains content data from a video output apparatus using one of a plurality of transfer protocols and displays the obtained content data, comprising:

a first obtaining unit that obtains, from the video output apparatus, information of content data, including information regarding at least a coding scheme;

a first determination unit that determines whether the content data is decodable by the video display apparatus based on information regarding the coding scheme obtained by the first obtaining unit;

a determining unit that determines, when it has been determined by the first determination unit that the content data is not decodable by the video display apparatus, among the plurality of transfer protocols, a transfer protocol in which the content data is decoded at the video output apparatus and transferred by a stream transfer;

a request unit that specifies the transfer protocol determined by the determining unit and requests the video output apparatus for transfer of the content data;

a GUI generating unit that generates a GUI to be displayed on the video display apparatus;

a second obtaining unit that obtains, from the video output apparatus, the GUI rendering capability of the video output apparatus; and a comparison unit that compares, when it has been determined by the first determination unit that the content data is decodable by the video display apparatus, the GUI rendering capability of the video output apparatus obtained by the second obtaining unit and a GUI rendering capability of the GUI generating unit, wherein when it has been determined by the comparison unit that the GUI rendering capability of the video output apparatus is higher than the GUI rendering capability of the GUI generating unit, the determining unit also determines, among the plurality of transfer protocols, a transfer protocol in which the content data is decoded at the video output apparatus and transferred by a stream transfer.

4. The video display apparatus according to claim 3, wherein when it has been determined by the comparison unit that the GUI rendering capability of the GUI generating unit is higher than the GUI rendering capability of the video output apparatus, the determining unit determines, among the plurality of transfer protocols, a transfer protocol in which the content data is transferred by a file transfer without being decoded at the video output apparatus.

5. A video output apparatus that outputs content data stored in a storage device to a video display apparatus using one of a plurality of transfer protocols, comprising:

a first obtaining unit that obtains, from the video display apparatus, information regarding at least a coding scheme for content data stored by the video display apparatus;

a first determination unit that determines a coding scheme decodable by the video display apparatus based on information regarding the coding scheme obtained by the first obtaining unit;

a second determination unit that determines, when it has been determined by the first determination unit that the content data stored in the storage device is decodable by the video display apparatus, whether format conversion of the content data stored in the storage device is required to the video display apparatus;

a determining unit that determines, when it has been determined by the first determination unit that the coding scheme of the content data stored in the storage device is not a coding scheme decodable by the video display apparatus, among the plurality of transfer protocols, a transfer protocol in which the content data is decoded at the video output apparatus and transferred by a stream transfer; and a notification unit that notifies the video display apparatus of the transfer protocol determined by the determining unit, wherein when it has been determined by the second determination unit that the format conversion of the content data stored in the storage device is required to the video display apparatus, the determining unit also determines, among the plurality of transfer protocols, a transfer protocol in which the content data is not decoded at the video output apparatus and transferred by a file transfer.

6. A control method of a video display apparatus that obtains content data from a video output apparatus using one of a plurality of transfer protocols and displays the obtained content data, comprising:

a first obtaining step of obtaining, from the video output apparatus, information of content data, including information regarding at least a coding scheme;

a first determination step of determining whether the content data is decodable by the video display apparatus based on information regarding the coding scheme obtained in the first obtaining step;

a second determination step of determining, when it has been determined in the first determination step that the content data is decodable by the video display apparatus, whether format conversion of the content data is required to the video display apparatus;

a determining step of determining, when it has been determined in the first determination step that the content data is not decodable by the video display apparatus, among the plurality of transfer protocols, a transfer protocol in which the content data is decoded at the video output apparatus and transferred by a stream transfer; and a request step of specifying the transfer protocol determined in the determining step and requesting the video output apparatus for transfer of the content data, wherein when it has been determined in the second determination step that the format conversion of the content data is required to the video display apparatus, the determining step also determines, among the plurality of transfer protocols, a transfer protocol in which the content data is not decoded at the video output apparatus and transferred by a file transfer.

7. A control method of a video output apparatus that outputs content data stored in a storage device to a video display apparatus using one of a plurality of transfer protocols, comprising:

a first obtaining step of obtaining, from the video display apparatus, information regarding at least a coding scheme for content data stored by the video display apparatus;

a first determination step of determining a coding scheme decodable by the video display apparatus based on information regarding the coding scheme obtained in the first obtaining step;

a second determination step of determining, when it has been determined in the first determination step that the content data stored in the storage device is decodable by the video display apparatus, whether format conversion of the content data stored in the storage device is required to the video display apparatus;

a determining step of determining, when it has been determined by in first determination step that the coding scheme of the content data stored in the storage device is not a coding scheme decodable by the video display apparatus, among the plurality of transfer protocols, a transfer protocol in which the content data is decoded at the video output apparatus and transferred by a stream transfer; and a notification step of notifying the video display apparatus of the transfer protocol determined in the determining step, wherein when it has been determined in the second determination step that the format conversion of the content data stored in the storage device is required to the video display apparatus, the determining step also determines, among the plurality of transfer protocols, a transfer protocol in which the content data is not decoded at the video output apparatus and transferred by a file transfer.

8. A control method of a video display apparatus which has a GUI generating unit that generates a GUI to be displayed on a video display apparatus and obtains content data from the video output apparatus using one of a plurality of transfer protocols and displays the obtained content data, comprising:

a first obtaining step of obtaining, from the video output apparatus, information of content data, including information regarding at least a coding scheme;

a first determination step of determining whether the content data is decodable by the video display apparatus based on information regarding the coding scheme obtained in the first obtaining step;

a determining step of determining, when it has been determined in the first determination step that the content data is not decodable by the video display apparatus, among the plurality of transfer protocols, a transfer protocol in which the content data is decoded at the video output apparatus and transferred by a stream transfer;

a request step of specifying the transfer protocol determined in the determining step and requesting the video output apparatus for transfer of the content data;

a second obtaining step of obtaining, from the video output apparatus, the GUI rendering capability of the video output apparatus; and a comparison step of comparing, when it has been determined in the first determination step that the content data is decodable by the video display apparatus, the GUI rendering capability of the video output apparatus obtained in the second obtaining step and a GUI rendering capability of the GUI generating unit, wherein when it has been determined in the comparison step that the GUI rendering capability of the video output apparatus is higher than the rendering capability of the GUI generating unit, the determining unit also determines, among the plurality of transfer protocols, a transfer protocol in which the content data is decoded at the video output apparatus and transferred by a stream transfer.

* * * * *